US012667107B2

(12) United States Patent
Frith

(10) Patent No.: US 12,667,107 B2
(45) Date of Patent: Jun. 30, 2026

---

(54) PINE OIL-BASED HERBICIDE

(71) Applicant: GREENPRO SOLUTIONS PTY LTD, Warana (AU)

(72) Inventor: Hugh Frith, Warana (AU)

(73) Assignee: GREENPRO SOLUTIONS PTY LTD, Warana (AU)

(*) Notice: Subject to any disclaimer, the term of this patent is extended or adjusted under 35 U.S.C. 154(b) by 1066 days.

(21) Appl. No.: 17/622,082

(22) PCT Filed: Jun. 25, 2020

(86) PCT No.: PCT/AU2020/050646
§ 371 (c)(1),
(2) Date: Dec. 22, 2021

(87) PCT Pub. No.: WO2020/257858
PCT Pub. Date: Dec. 30, 2020

(65) Prior Publication Data
US 2022/0256864 A1     Aug. 18, 2022

Related U.S. Application Data

(60) Provisional application No. 62/866,525, filed on Jun. 25, 2019.

(30) Foreign Application Priority Data

Dec. 18, 2019    (AU) ................................ 2019904785

(51) Int. Cl.
| | |
|---|---|
| *A01N 65/06* | (2009.01) |
| *A01N 27/00* | (2006.01) |
| *A01N 31/06* | (2006.01) |
| *A01N 43/90* | (2006.01) |

(52) U.S. Cl.
CPC ............. *A01N 65/06* (2013.01); *A01N 27/00* (2013.01); *A01N 31/06* (2013.01); *A01N 43/90* (2013.01)

(58) Field of Classification Search
CPC .................................................. A01N 65/06
See application file for complete search history.

(56) References Cited

U.S. PATENT DOCUMENTS

| | | | |
|---|---|---|---|
| 6,291,401 | B1 | 9/2001 | Dufau et al. |
| 6,759,370 | B1 | 7/2004 | Innes |
| 2009/0048108 | A1 | 2/2009 | Innes et al. |
| 2019/0223451 | A1 | 7/2019 | Eveland et al. |

FOREIGN PATENT DOCUMENTS

| | | | |
|---|---|---|---|
| EP | 1073337 | | 2/2005 |
| GB | 2121071 | A | 12/1983 |
| ID | S201700679 | A * | 12/2017 |
| JP | 2002154909 | | 5/2002 |
| WO | 9953764 | A2 | 10/1999 |
| WO | 2008120095 | | 10/2008 |
| WO | 2016148627 | | 9/2016 |

OTHER PUBLICATIONS

"BioWeed Herbicide", Gemm Chemicals, 2016. (Year: 2016).*
Australian Application No. AU2019904785, Search Report mailed on Jan. 30, 2020, 9 pages.
Cabanne, Increased Efficacy of Clodinafop-Propargyl by Terpineols and Synergistic Action with Esterified Fatty Acids, Weed Research, vol. 40, 2000, pp. 181-189.
New Zealand Application No. NZ772461, First Examination Report mailed on Mar. 18, 2021, 4 pages.
New Zealand Application No. NZ772461, Second Examination Report mailed on May 12, 2021, 4 pages.
International Application No. PCT/AU2020/050646, International Search Report and Written Opinion mailed on Sep. 7, 2020, 9 pages.
"Pinechem™ 300 Distilled Tall Oil," Lawter Technical Data Sheet, May 2, 2011, 1 page.
"Pinechem™ 530 Pine Oil," Lawter, Technical Data sheet, May 2, 2011, 1 page.
EP20830611.8 , "Extended European Search Report," Jul. 11, 2022, 13 pages.
PCT/AU2020/050646 , "International Preliminary Report on Patentability," Jan. 6, 2022, 6 pages.
"What are the Regulatory Definitions for "Ambient", "Room Temperature" and "Cold Chain"?", ECA Academy: News Details, Mar. 2, 2017, pp. 1-3.
EP Application No. 20830611.8 , "Office Action", Feb. 5, 2024, 11 pages.
Quitmeyer , "pH Measurement in Aqueous and Non-Aqueous Solutions: When Used in Combination with Titration, pH Measurement is a Simple Method to Monitor Bath Concentration", Metal Finishing, vol. 106, No. 10, Oct. 1, 2008, pp. 21-24.

* cited by examiner

*Primary Examiner* — Gina C Justice

(74) *Attorney, Agent, or Firm* — Kilpatrick Townsend & Stockton LLP

(57) ABSTRACT

The present invention relates to a herbicide formulation based on pine oil. The present invention also relates to a method of reducing unwanted vegetation in a soil environment and a method for reducing seed viability using the herbicide formulation. The herbicide formulation comprises a pine oil, a tall oil, and an alkali. The formulation has improved herbicidal properties, and is less subject to coagulation at low ambient temperatures.

28 Claims, 1 Drawing Sheet

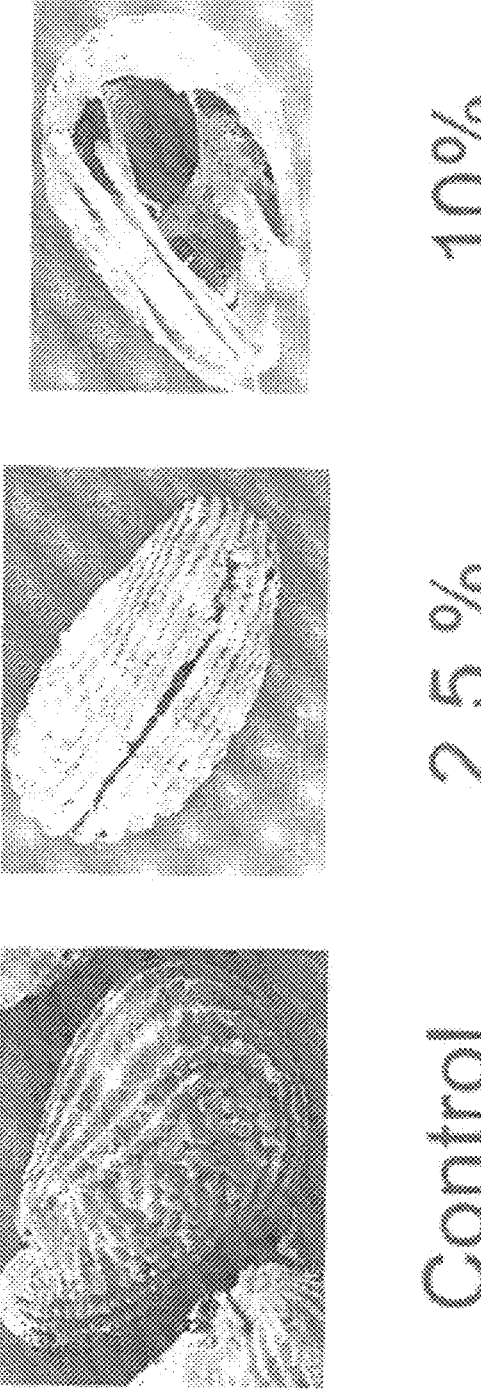

PINE OIL-BASED HERBICIDE

CROSS-REFERENCE TO RELATED APPLICATIONS

The present application is a U.S. National Phase under 35 U.S.C. § 371 of International Patent Application No. PCT/AU2020/050646, filed Jun. 25, 2020, which claims priority to U.S. provisional patent application No. 62/866,525 filed on 25 Jun. 2019 and Australian provisional patent application no. 2019904785 filed on 18 Dec. 2019, the entire contents of which are incorporated herein by reference.

FIELD OF THE INVENTION

The present invention relates to a herbicide composition based on pine oil. The present invention also relates to a method of reducing unwanted vegetation in a soil environment and a method for reducing seed viability using the herbicide composition.

BACKGROUND OF THE INVENTION

U.S. Pat. No. 6,759,370 ("Innes") teaches a herbicidal combination of monoterpene alcohols and fatty acid soaps, where the fatty acid soap may be derived from the reaction of a tall oil with an alkali. Initially, the inventor believed that the added fatty acid soap enhanced the effect of the primary active components and/or acted as an active component to disrupt plant function. This patent further stated that the herbicide is non-selective but was most effective against broad leaf plants.

PCT Application PCT/IB2008/000802 ("Innes & Johnson") teaches a herbicide mixture comprising alpha-terpineol and tall oil and a method for applying the herbicide wherein vapour is released by the mixture over soil for more than 10 minutes, which has the effect of disrupting plant function to a greater degree than the formulation of the earlier Innes patent.

Specifically, Innes & Johnson discovered that the herbicidal activity of the pine oil was due to the alpha-terpineol fraction only, thus resulting in a significant improvement over the prior art given that raw materials high in alpha-terpineol could be preferentially selected for use as the active ingredient of the herbicide.

In the case of both Innes and the later Innes & Johnson references, the pine oil used was derived from sulphate wood turpentine. Sulphate turpentine is obtained by condensation of the vapours during the cook in the Kraft (Sulphate) Pulping Process for producing paper. Specifically, the pine oil used for the basis of the herbicide was Pinechem 530 (sourced from Lawter Chemicals of New Zealand) which consisted of 60-70% pine oil.

As discussed herein, the inventor has discovered that the prior formulations developed from the pine oil derived from the Kraft Pulping Process, hereafter referred to as synthetic pine oil, have been discovered to have contained various impurities and other material that impeded the efficacy of the herbicides. As discussed herein, NaOH is used to extract the pine oil fraction from the pulping process. The pine oil is then processed into fractions, such as synthetic pine oil. NaOH was also used in U.S. Pat. No. 6,759,370 to convert the tall oil in the mix into a soap for the purposes of surfaction.

All references, including any patents or patent applications cited in this specification, are hereby incorporated by reference. No admission is made that any reference constitutes prior art.

SUMMARY OF THE INVENTION

According to a first aspect of the invention, there is provided an organic herbicide product comprising:
low lignin content pine oil about 48%-80% (w/w);
low to medium rosin tall oil about 15%-40% (w/w);
KOH about 3%-10% (w/w);
wherein the pH of the product is about 8 to about 12.

According to another aspect of the invention, there is provided an organic herbicide product comprising:
low lignin content pine oil 48%-75% (w/w);
low to medium rosin tall oil 18%-31% (w/w);
KOH about 3%-8% (w/w);
wherein the pH of the product is about 10 to about 11.

According to another aspect of the invention, there is provided an organic herbicide product comprising:
low lignin content pine oil 48%-75% (w/w);
low to medium rosin tall oil 19.4%-23% (w/w);
KOH about 4%-8% (w/w);
wherein the pH of the product is about 10 to about 11.

According to another aspect of the invention, there is provided an organic herbicide product comprising:
low lignin content pine oil about 48%-80% (w/w);
low to medium rosin tall oil about 15%-40% (w/w);
KOH and NaOH in a combined amount of about 3%-10% (w/w);
wherein the pH of the product is about 8 to about 12.

In some embodiments, the low lignin content pine oil is present at 53%-75% (w/w) or 61%-75% (w/w), e.g. 72% (w/w). In some embodiments, the low lignin content pine oil is present at 53%-72% (w/w) or 61%-72% (w/w). In some embodiments, the low lignin content pine oil is present at 61% (w/w). In some embodiments, the low lignin content pine oil is present at 72% (w/w). In some embodiments, the low lignin content pine oil is present at 72% (w/w). In some embodiments, the low lignin content pine oil is present at 75% (w/w).

According to another aspect of the invention, there is provided a method of reducing unwanted vegetation in a soil environment comprising applying to the soil environment an effective amount of the organic herbicide product described above, e.g. by spraying.

Thus, according to another aspect of the invention, there is provided a method of reducing unwanted vegetation in a soil environment comprising:
spraying the soil environment with an effective amount of an organic herbicide product comprising:
low lignin content pine oil about 48%-80% (w/w);
low to medium rosin tall oil about 15%-40% (w/w);
KOH about 3%-10% (w/w);
wherein the pH of the product is about 8 to about 12.

According to another aspect of the invention, there is provided a method of reducing unwanted vegetation in a soil environment comprising:
spraying the soil environment with an effective amount of an organic herbicide product comprising:
low lignin content pine oil 48%-75% (w/w);
low to medium rosin tall oil 18%-31% (w/w);
KOH about 3%-8% (w/w);
wherein the pH of the product is about 10 to about 11.

According to another aspect of the invention, there is provided a method of reducing unwanted vegetation in a soil environment comprising:

spraying the soil environment with an effective amount of an organic herbicide product comprising:

low lignin content pine oil 48%-75% (w/w);

low to medium rosin tall oil 19.4%-23% (w/w);

KOH about 4%-8% (w/w);

wherein the pH of the product is about 10 to about 11.

According to another aspect of the invention, there is provided a method of reducing unwanted vegetation in a soil environment comprising:

spraying the soil environment with an effective amount of an organic herbicide product comprising:

low lignin content pine oil about 48%-80% (w/w);

low to medium rosin tall oil about 15%-40% (w/w);

KOH and NaOH in a combined amount of about 3%-10% (w/w);

wherein the pH of the product is about 8 to about 12.

According to another embodiment of the invention, there is provided a method for reducing seed viability comprising applying to a soil environment an effective amount of the organic herbicide product described above, e.g. by spraying.

Thus, according to another embodiment of the invention, there is provided a method for reducing seed viability comprising:

spraying a soil environment with an effective amount of an organic herbicide product comprising:

low lignin content pine oil about 48%-80% (w/w);

low to medium rosin tall oil about 15%-40% (w/w);

KOH about 3%-10% (w/w);

wherein the pH of the product is about 8 to about 12.

According to another embodiment of the invention, there is provided a method for reducing seed viability comprising:

spraying a soil environment with an effective amount of an organic herbicide product comprising:

low lignin content pine oil 48%-75% (w/w);

low to medium rosin tall oil 18%-31% (w/w);

KOH about 3%-8% (w/w);

wherein the pH of the product is about 10 to about 11.

According to another embodiment of the invention, there is provided a method for reducing seed viability comprising:

spraying a soil environment with an effective amount of an organic herbicide product comprising:

low lignin content pine oil 48%-75% (w/w);

low to medium rosin tall oil 19.4%-23% (w/w);

KOH about 4%-8% (w/w);

wherein the pH of the product is about 10 to about 11.

According to another embodiment of the invention, there is provided a method for reducing seed viability comprising:

spraying a soil environment with an effective amount of an organic herbicide product comprising:

low lignin content pine oil about 48%-80% (w/w);

low to medium rosin tall oil about 15%-40% (w/w);

KOH and NaOH in a combined amount of about 3%-10% (w/w);

wherein the pH of the product is about 8 to about 12.

In some embodiments, the organic herbicide product damages the shell casing of the seed, thereby exposing the interior of the seed to the elements.

In some embodiments, the seed is present in the soil environment and/or is present on unwanted vegetation growing within the soil environment.

According to another aspect of the invention, there is provided a process for preparing the organic herbicide product described above, the process comprising mixing at ambient temperature for a time sufficient to cause saponification:

low lignin content pine oil about 48%-80% (w/w);

low to medium rosin tall oil about 15%-40% (w/w);

KOH about 3%-10% (w/w);

wherein the pH of the product is about 8 to about 12.

According to another aspect of the invention, there is provided a process for preparing the organic herbicide product described above, the process comprising mixing at ambient temperature for a time sufficient to cause saponification:

low lignin content pine oil 48%-75% (w/w);

low to medium rosin tall oil 18%-31% (w/w);

KOH about 3%-8% (w/w);

wherein the pH of the product is about 10 to about 11.

According to another aspect of the invention, there is provided a process for preparing the organic herbicide product described above, the process comprising mixing at ambient temperature for a time sufficient to cause saponification:

low lignin content pine oil 48%-75% (w/w);

low to medium rosin tall oil 19.4%-23% (w/w);

KOH about 4%-8% (w/w);

wherein the pH of the product is about 10 to about 11.

According to another aspect of the invention, there is provided a process for preparing the organic herbicide product described above, the process comprising mixing at ambient temperature for a time sufficient to cause saponification:

low lignin content pine oil about 48%-80% (w/w);

low to medium rosin tall oil about 15%-40% (w/w);

KOH and NaOH in a combined amount of about 3%-10% (w/w);

wherein the pH of the product is about 8 to about 12.

Thus, the present invention provides the following items 1 to 40:

1. An organic herbicide product comprising:

low lignin content pine oil about 48%-80% (w/w);

low to medium rosin tall oil about 15%-40% (w/w); and either KOH about 3%-10% (w/w), or KOH and NaOH in a combined amount of about 3%-10% (w/w);

wherein the pH of the product is about 8 to about 12.

2. The organic herbicide product according to item 1, comprising:

low lignin content pine oil 48%-75% (w/w);

low to medium rosin tall oil 19.4%-23% (w/w);

KOH about 4%-8% (w/w);

wherein the pH of the product is about 10 to about 11.

3. The organic herbicide product according to item 1 or 2, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

5

4. The organic herbicide product according to any one of items 1-3, wherein the low lignin content pine oil is hand-tapped pine oil or synthetic pine oil.

5. The organic herbicide product according to any one of items 1-4, wherein the low lignin content pine oil has trace levels of lignin.

6. The organic herbicide product according to any one of items 1-5, wherein the product is substantially free of NaOH.

7. The organic herbicide product according to any one of items 1-6, wherein the low lignin content pine oil is 53-68% (w/v) of the organic herbicide product.

8. The organic herbicide product according to any one of items 1-6, wherein the low lignin content pine oil is 61-68% (w/v) of the organic herbicide product.

9. A method of reducing unwanted vegetation in a soil environment comprising:
   spraying the soil environment with an effective amount of an organic herbicide product comprising:
   low lignin content pine oil about 48%-80% (w/w);
   low to medium rosin tall oil about 15%-40% (w/w);
   either KOH about 3%-10% (w/w), or KOH and NaOH in a combined amount of about 3%-10% (w/w);
   wherein the pH of the product is about 8 to about 12.

10. The method according to item 9, comprising:
   spraying the soil environment with an effective amount of an organic herbicide product comprising:
   low lignin content pine oil 48%-75% (w/w);
   low to medium rosin tall oil 19.4%-23% (w/w);
   KOH about 4%-8% (w/w);
   wherein the pH of the product is about 10 to about 11.

11. The method according to item 9 or 10, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

12. The method according to any one of items 9-11, wherein the low lignin content pine oil is hand-tapped pine oil or synthetic pine oil.

13. The method according to any one of items 9-12, wherein the low lignin content pine oil has trace levels of lignin.

14. The method according to any one of items 9-13, wherein the organic herbicide product is substantially free of NaOH.

15. The method according to any one of items 9-14, wherein the low lignin content pine oil is at 53-68% (w/v) of the organic herbicide product.

16. The method according to any one of items 9-14, wherein the low lignin content pine oil is at 61-68% (w/v) of the organic herbicide product.

17. The method according to any one of items 9-16, wherein the unwanted vegetation is annual ryegrass (*Lolium rigidum*), red-root amaranth (*Amaranthus retroflexus*), fat hen (*Chenopodium album*), or blackberry nightshade (*Solanum nigrum*).

18. A method for reducing seed viability comprising:
   spraying a soil environment with an effective amount of an organic herbicide product comprising:
   low lignin content pine oil about 48%-80% (w/w);
   low to medium rosin tall oil about 15%-40% (w/w);
   either KOH about 3%-10% (w/w), or KOH and NaOH in a combined amount of about 3%-10% (w/w);
   wherein the pH of the product is about 8 to about 12.

19. The method according to item 18, comprising:
   spraying a soil environment with an effective amount of an organic herbicide product comprising:
   low lignin content pine oil 48%-75% (w/w);
   low to medium rosin tall oil 19.4%-23% (w/w); and
   KOH about 4%-8% (w/w);
   wherein the pH of the product is about 10 to about 11.

20. The method according to item 18 or 19, wherein the organic herbicide product damages the shell casing of the seed, thereby exposing the interior of the seed to the elements.

21. The method according to any one of items 18-20, wherein the seed is present in the soil environment and/or is present on unwanted vegetation growing within the soil environment.

22. The method according to any one of items 18-21, wherein the low lignin content pine oil comprises (% w/w):

| | |
|---|---|
| 3-carene | 1.3%-2.0% |
| Limonene | 6.0%-7.20 |
| Eucalyptol | 0.08%-0.90% |
| g terpinene | 1.00%-1.55% |
| limonene isomer | 10.90%-11.10% |
| fenchol | 1.00%-1.70% |
| b terpinenol | 4.40%-5.50% |
| g terpinenol | 3.00%-3.10% |
| endo borneol | 1.50%-2.30% |
| terpinen-4-ol | 1.80%-2.10% |
| alpha-terpinenol | 48.0%-54.9%; and |
| 2-carene | 9.00%-9.35%. |

23. The method according to any one of items 18-22, wherein the low lignin content pine oil is hand-tapped pine oil or synthetic pine oil.

24. The method according to any one items 18-23, wherein the low lignin content pine oil has trace levels of lignin.

25. The method according to any one items 18-24, wherein the organic herbicide product is substantially free of NaOH.

26. The method according to any one items 18-25, wherein the low lignin content pine oil is at 53-68% (w/v) of the organic herbicide product.

27. The method according to any one items 18-25, wherein the low lignin content pine oil is at 61-68% (w/v) of the organic herbicide product.

28. The method according to any one of items 18-27, for reducing the seed viability for seeds of annual ryegrass (*Lolium rigidum*), red-root amaranth (*Amaranthus retroflexus*), fat hen (*Chenopodium album*), or blackberry nightshade (*Solanum nigrum*).

29. A process for preparing an organic herbicide product, the process comprising mixing at ambient temperature for a time sufficient to cause saponification:
   low lignin content pine oil about 48%-80% (w/w);
   low to medium rosin tall oil about 15%-40% (w/w);
   KOH about 3%-10% (w/w);
   wherein the pH of the product is about 8 to about 12.

30. A process for preparing an organic herbicide product, the process comprising mixing at ambient temperature for a time sufficient to cause saponification:

low lignin content pine oil 48%-75% (w/w);
low to medium rosin tall oil 19.4%-23% (w/w);
KOH about 4%-8% (w/w);
wherein the pH of the product is about 10 to about 11.

31. A process for preparing an organic herbicide product, the process comprising mixing at ambient temperature for a time sufficient to cause saponification:
low lignin content pine oil about 48%-80% (w/w);
low to medium rosin tall oil about 15%-40% (w/w);
KOH and NaOH in a combined amount of about 3%-10% (w/w);
wherein the pH of the product is about 8 to about 12.

32. The process according to any one of items 29-31, wherein the mixing is conducted at a temperature of from about 10° C. to about 35° C.

33. The process according to any one of items 29-32, wherein the mixing is conducted for about 1 to about 5 hours.

34. The process according to any one of items 29-33, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

35. The process according to any one of items 29-34, wherein the low lignin content pine oil is hand-tapped pine oil or synthetic pine oil.

36. The process according to any one of items 29-35, wherein the low lignin content pine oil has trace levels of lignin.

37. The process according to any one of items 29-36, wherein the product is substantially free of NaOH.

38. The process according to any one of items 29-37, wherein the low lignin content pine oil is 53-68% (w/v) of the organic herbicide product.

39. The process according to any one of items 29-37, wherein the low lignin content pine oil is 61-68% (w/v) of the organic herbicide product.

40. An organic herbicide product prepared by the process according to any one of items 29-39.

BRIEF DESCRIPTION OF THE FIGURES

FIG. 1. Electron Microscope photos of seeds subjected to different percentages of the organic herbicide of the invention. The left frame shows a control or untreated seed. The middle frame shows an exemplary seed treated with 2.5% (w/w) herbicide which shows visible cracking of the seed casing. The right frame shows an exemplary seed treated with 10% (w/w) organic herbicide which shows opening of the seed casing and exposure of the interior of the seed.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, the term "about" refers to a value that is within not more than plus or minus 10% or for example within plus or minus 5% of the recited value.

As used herein, the term "soil environment" refers to the soil in which a plant is grown or is growing. As will be appreciated by one of skill in the art, in this context, the plant is "wanted vegetation" or "desired vegetation".

As used herein, the terms "alpha-terpineol" and "alpha-terpinenol" are used interchangeably throughout this specification, and are synonyms for p-menth-1-en-8-ol.

As used herein, the terms "rosin" and "rosin acid" are used interchangeably throughout this specification, and refers to a solid form of resin obtained from pines.

As used herein, the term "low to medium rosin tall oil" refers to tall oil having a low to medium content of rosin acid, and encompasses a tall oil having a low content of rosin acid and a tall oil having a medium content of rosin acid. A low rosin tall oil (i.e. a tall oil having a low content of rosin acid) typically has 1% (w/w) or less rosin acid. A medium rosin tall oil (i.e. a tall oil having a medium content of rosin acid) typically has more than 1% (w/w) to about 33% (w/w) rosin acid.

Unless otherwise stated, all amounts expressed as percentages are percentages weight by weight (% (w/w)).

Throughout this specification, including the claims, the word "include", or variations thereof such as "includes" or "including", will be understood to imply the inclusion of a stated feature, integer or step, or group of features, integers or steps, but not the exclusion of any other feature, integer or step, or group of features, integers or steps.

Throughout this specification, including the claims, except where the context requires otherwise due to express language or necessary implication, the word "comprise" or variations such as "comprises" or "comprising" is used in an inclusive sense, i.e. to specify the presence of a stated feature, integer or step, or group of features, integers or steps, but not to preclude the presence or addition of a further feature, integer or step, or a further group of features, integers or steps, in various embodiments of the invention.

The terms "consists essentially of" or "consisting essentially of" have a partially closed meaning, that is, they do not permit inclusion of features, integers or steps which would substantially change the essential characteristics of a method, process, product or composition; for example, features or integers or steps which would significantly interfere with the desired properties of the products and compositions described herein, i.e., the method, process, product or composition is limited to the specified features, integers or steps and those which do not materially affect the basic and novel characteristics of the invention.

The terms "consists of" and "consists" are closed terminology and allow only for the inclusion of the recited features, integers or steps.

The prior art synthetic pine oil-based herbicide (Organic Interceptor™) was prepared as follows by mixing the components in a mix vessel and then heating the mix vessel at 80° C. for 7 to 10 hours:
Synthetic New Zealand pine oil (Pinechem 530; CAS 800-09-3) added at 684 g/L;

distilled tall oil (Pinechem 317; CAS 8002-26-4) 159 g/L
    (purpose: acid reaction ingredient to produce tall oil
    soap);
NaOH (CAS 1310-73-2) added at 8.4 g/L (purpose:
    alkaline reaction to form tall oil soap);
KOH (CAS 1310-58-3) added at 12.6 g/L (purpose:
    alkaline reaction to form tall oil soap);
Water (CAS 7732-18-5) added to adjust mix to 1 L.

As discussed in PCT/IB2008/000802, a tall oil—hydroxide solution mixture was prepared to promote the formation of soaps with the fatty acids present in the tall oil.

In this formulation, water was added as a dilutant/carrier and was thought to extend to distribution of other components within the mixture.

As will be apparent to those of skill in the art, dipentene was already present in the pine oil. However, at the time, it was believed that dipentene improved the efficiency of the active alpha-terpineol and consequently additional dipentene was added.

As discussed herein, it has subsequently been discovered that there are several impurities or anti-efficacy agents within this formulation and the method of producing same that have a negative impact on the efficacy of the product.

For example, while heating of the product to 80° C. was necessary for uniform mixing of the product, this heating step was in fact reducing the alpha-terpineol levels in the formulation.

Similarly, it was found that rather than improving the efficacy of the formulation, dipentene in fact restricts the ability of alpha-terpineol to break down wax on the weed leaf tissue. Removal of this wax coating by alpha-terpineol exposes the epidermal cells in the leaf structure which in turn results in blackening or browning of the leaf tissue and loss of water. Pinechem 317 is about 30-33% (w/w) rosin acid, which results in the rosin acid settling in the bottom of the shipping/storage containers.

In addition to the impurities contained in the original pine oil (Pinechem 530) there were further impurities contained in the formulation mix as discussed herein, which were discovered to have a deleterious impact on the composition, its working in the field and in its commercial application, as discussed in greater detail below. For example, some synthetic pine oils can have a lignin content of 1-7% (w/v). Pinechem 530 is commercially available.

Described herein is a low lignin content pine oil-based herbicide. For example, the lignin may be present in the pine oil at only a trace amount.

One example of a suitable low lignin content pine oil is hand-tapped pine oil which is prepared by tapping a pine tree directly. The tapped pine sap is passed over screens to remove any foreign material and is then washed with water. It is then steam-distilled into pine oil and rosin without the use of NaOH.

According to a first aspect of the invention, there is provided an organic herbicide product comprising:
    low lignin content pine oil about 48%-80% (w/w);
    low to medium rosin tall oil about 15%-40% (w/w);
    KOH about 3%-10% (w/w);
    wherein the pH of the product is about 8 to about 12.

According to another aspect of the invention, there is provided an organic herbicide product comprising:
    low lignin content pine oil 48%-75% (w/w);
    low to medium rosin tall oil 18%-31% (w/w);
    KOH about 3%-8% (w/w);
    wherein the pH of the product is about 10 to about 11.

According to another aspect of the invention, there is provided an organic herbicide product comprising:

low lignin content pine oil 48%-75% (w/w);
    low to medium rosin tall oil 19.4%-23% (w/w);
    KOH about 4%-8% (w/w);
    wherein the pH of the product about 10 to about 11.

According to another aspect of the invention, there is provided an organic herbicide product comprising:
    low lignin content pine oil about 48%-80% (w/w);
    low to medium rosin tall oil about 15%-40% (w/w);
    KOH and NaOH in a combined amount of about 3%-10% (w/w);
    wherein the pH of the product is about 8 to about 12.

In some embodiments, the low lignin content pine oil is present at 53%-68% (w/w) or 61%-68% (w/w). In some embodiments, the low lignin content pine oil is present at 53% (w/w). In some embodiments, the low lignin content pine oil is present at 61% (w/w). In some embodiments, the low lignin content pine oil is present at 68% (w/w). In some embodiments, the low lignin content pine oil is present at 75% (w/w). For example, the low lignin content pine oil may be present at 53% (w/w), 54% (w/w), 55% (w/w), 56% (w/w), 57% (w/w), 58% (w/w), 59% (w/w), 60% (w/w), 61% (w/w), 62% (w/w), 63% (w/w), 64% (w/w), 65% (w/w), 66% (w/w), 67% (w/w), 68% (w/w), 68.5% (w/w), 69% (w/w), 70% (w/w), 71% (w/w), 72% (w/w), 73% (w/w), 74% (w/w), or 75% (w/w).

In some embodiments, the low lignin content pine oil is present at 53%-68% (w/v) or 61%-68% (w/v). In some embodiments, the low lignin content pine oil is present at 53% (w/v). In some embodiments, the low lignin content pine oil is present at 61% (w/v). In some embodiments, the low lignin content pine oil is present at 68% (w/v). In some embodiments, the low lignin content pine oil is present at 75% (w/v). For example, the low lignin content pine oil may be present at 53% (w/v), 54% (w/v), 55% (w/v), 56% (w/v), 57% (w/v), 58% (w/v), 59% (w/v), 60% (w/v), 61% (w/v), 62% (w/v), 63% (w/v), 64% (w/v), 65% (w/v), 66% (w/v), 67% (w/v), 68% (w/v), 68.5% (w/v), 69% (w/v), 70% (w/v), 71% (w/v), 72% (w/v), 73% (w/v), 74% (w/v), or 75% (w/v).

In some embodiments, the low to medium rosin tall oil is present at 18% (w/w). In some embodiments, the low to medium rosin tall oil is present at 31% (w/w). In some embodiments, the low to medium rosin tall oil may be present at 18% (w/w), 19% (w/w), 19.4% (w/w), 20% (w/w), 21% (w/w), 22% (w/w), 23% (w/w), 24% (w/w), 25% (w/w), 26% (w/w), 27% (w/w), 28% (w/w), 29% (w/w), 30% (w/w), or 31% (w/w). In some embodiments, the low to medium rosin tall oil is a low rosin tall oil. In some embodiments, the low to medium rosin tall oil is a medium rosin tall oil. In some embodiments, the low rosin tall oil has 1% (w/w) or less rosin acid. In some embodiments, the medium rosin tall oil typically has more than 1% (w/w) to about 33% (w/w) rosin acid, e.g. more than 1% (w/w) to about 3% (w/w) rosin acid, about 28-30% (w/w) rosin acid, or about 30-33% (w/w) rosin acid. Low rosin tall oils and medium rosin tall oils suitable for use in the invention are commercially available, e.g. from Lawter, Inc.

In some embodiments, the KOH (potassium hydroxide) is present at 3% (w/w), 3.5% (w/w), 4% (w/w), 4.5% (w/w), 5% (w/w), 5.5% (w/w), 6% (w/w), 6.5% (w/w), 7% (w/w), 7.5% (w/w), 8% (w/w), 8.5% (w/w), 9% (w/w), 9.5% (w/w), or 10% (w/w). In some embodiments, the KOH (potassium hydroxide) is present at 8% (w/w). The KOH may be added as a solid or in the form of an aqueous solution. In some embodiments, the KOH is added as solid. In some embodiments, the KOH is added in the form an aqueous solution. Typically, the KOH is added in the form an aqueous solution. The concentration of the KOH solution may, for example, be 10% (w/w), 15% (w/w), 20% (w/w), 25% (w/w), 30% (w/w), 35% (w/w), 40% (w/w), 45% (w/w), 47% (w/w), 50% (w/w), 55% (w/w), or 60% (w/w).

In some embodiments, the organic herbicide product additionally comprises NaOH (sodium hydroxide). The NaOH may be added as a solid or in the form of an aqueous solution. In some embodiments, the NaOH is added as solid. In some embodiments, the NaOH is added in the form an aqueous solution. Typically, the NaOH is added in the form an aqueous solution. The concentration of the NaOH solution may, for example, be 10% (w/w), 15% (w/w), 20% (w/w), 25% (w/w), 30% (w/w), 35% (w/w), 40% (w/w), 45% (w/w), 47% (w/w), 50% (w/w), 55% (w/w), or 60% (w/w). In some embodiments, the combined amount of KOH and NaOH in the organic herbicide product is 3% (w/w), 3.5% (w/w), 4% (w/w), 4.5% (w/w), 5% (w/w), 5.5% (w/w), 6% (w/w), 6.5% (w/w), 7% (w/w), 7.5% (w/w), 8% (w/w), 8.5% (w/w), 9% (w/w), 9.5% (w/w), or 10% (w/w). In some embodiments, the combined amount of KOH and NaOH is 8% (w/w).

In some embodiments, the pH of the product is about 8, about 8.5, about 9, about 9.5, about 10, about 10.5, about 11, about 11.5, about 12, or about 12.5.

In some embodiments, the pH of the product is about 10 to about 11. For example, the pH may be 10.1, 10.2, 10.3, 10.4, 10.5, 10.6, 10.7, 10.8, 10.9, or 11.

In some embodiments, the low lignin content pine oil comprises lignin at only a trace amount. In some embodiments, the low lignin content pine oil comprises less than 1% (w/v) lignin, preferably less than 0.5% (w/v), more preferably less than 0.1% (w/v). In some embodiments, the low lignin content pine oil comprises no lignin.

In some embodiments, the low lignin content pine oil is hand-tapped pine oil. The hand-tapped pine oil may be prepared by tapping a pine tree directly. The tapped pine sap may be passed over screens to remove any foreign material and then washed with water. It may then be steam-distilled into pine oil and rosin without the use of NaOH. Thus, in some embodiments, the product is substantially free of sodium hydroxide (NaOH). An example of a commercially available hand-tapped pine oil is Epinol 85™ which is 99% (w/w) pure pine oil.

In some embodiments, the low lignin content pine oil is a low lignin content synthetic pine oil, e.g. a low lignin content synthetic pine oil having low levels of impurities that have a deleterious impact on the organic herbicide product. A commercially available low lignin content synthetic pine oil is Pinechem 530, and contains a minimum of 85% (w/w) terpene alcohols, and typically 85-90% (w/w) terpene alcohols.

Pine oil can have a density which varies from about 0.91 g/cm$^3$ to about 0.95 g/cm$^3$ at 25° C., e.g. 0.91 g/cm$^3$, 0.92 g/cm$^3$, 0.93 g/cm$^3$, 0.94 g/cm$^3$ or 0.95 g/cm$^3$. Typically, pine oil has a density of about 0.92 g/cm$^3$ or 0.93 g/cm$^3$ at 25° C.

In some embodiments, the organic herbicide product does not contain sodium hydroxide (NaOH).

In some embodiments, the organic herbicide product does not comprise exogenously added water, i.e. water added as a separate component.

In some embodiments, the low lignin content pine oil comprises: 3-carene, limonene, eucalyptol, g terpinene, limonene isomer, fenchol, b terpinenol, g terpinenol, endo borneol, terpinen-4-ol, alpha-terpinenol, or 2-carene.

In some embodiments, the low lignin content pine oil comprises about 48% (w/w) to about 55% (w/w) alpha-terpineol. For example, the low lignin content pine oil may comprise about 48% (w/w), about 49% (w/w), about 50% (w/w), about 51% (w/w), about 52% (w/w), about 53% (w/w), about 54% (w/w), or about 55% (w/w) alpha-terpineol. In preferred embodiments, the low lignin content pine oil comprises about 53% (w/w) alpha-terpineol.

Alternatively, in some embodiments, the low lignin content pine oil has the following major components (% (w/w)):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; |
| 2-carene | 9.00%-9.35%. |

In some embodiments, the low lignin content pine oil is hand-tapped pine oil, for example, as sold under the brand name Epinol 85™, which is 99% (w/w) pure pine oil.

In some embodiments, the low to medium rosin tall oil is a tall oil that is 33% (w/w) or less rosin acid. For example, the low to medium rosin tall oil is a tall oil that is 33% (w/w) or less rosin acid, 32% (w/w) or less rosin acid, 31% (w/w) or less rosin acid, 30% (w/w) or less rosin acid, 29% (w/w) or less rosin acid, 28% (w/w) or less rosin acid, 25% (w/w) or less rosin acid, 20% (w/w) or less rosin acid, 15% (w/w) or less rosin acid, 10% (w/w) or less rosin acid, 5% (w/w) or less rosin acid, 4% (w/w) or less rosin acid, 3% (w/w) or less rosin acid, 2% (w/w) or less rosin acid, or 1% (w/w) or less rosin acid.

In some embodiments, the low to medium rosin tall oil is a distilled tall oil. In some embodiments, the low to medium rosin tall oil is a distilled tall oil that is 33% (w/w) or less rosin acid. For example, the low to medium rosin tall oil is a tall oil that is 33% (w/w) or less rosin acid, 32% (w/w) or less rosin acid, 31% (w/w) or less rosin acid, 30% (w/w) or less rosin acid, 29% (w/w) or less rosin acid, 28% (w/w) or less rosin acid, 25% (w/w) or less rosin acid, 20% (w/w) or less rosin acid, 15% (w/w) or less rosin acid, 10% (w/w) or less rosin acid, 5% (w/w) or less rosin acid, 4% (w/w) or less rosin acid, 3% (w/w) or less rosin acid, 2% (w/w) or less rosin acid, or 1% (w/w) or less rosin acid.

In some embodiments, the low to medium rosin tall oil is a medium rosin tall oil sold under the trade name Pinechem 300 (which contains 28-30% (w/w) rosin). Pinechem 300 is commercially available.

In some embodiments, the organic herbicide product comprises a low lignin content pine oil of natural origin. In some embodiments, the organic herbicide product comprises a low lignin content synthetic pine oil.

As the person skilled in the art will appreciate, the tall oil and the KOH, or the tall oil and a combination of KOH and NaOH, form a fatty acid soap. Thus, in one form of the invention, the organic herbicide product comprises the pine oil and a fatty acid soap formed from the tall oil and the KOH. In another form of the invention, the organic herbicide product comprises the pine oil and a fatty acid soap formed from the tall oil and the combination of KOH and NaOH.

As discussed above, it was initially believed that the active ingredient ("ai") was pine oil. While it was known that alpha-terpineol was effective, it was not known that the synthetic pine oil contained impurities including high percentages of lignin, which retarded and reduced the efficiency of the herbicidal composition.

According to another aspect of the invention, there is provided a method of reducing unwanted vegetation in a soil environment comprising:

spraying the soil environment with an organic herbicide product comprising:
    low lignin content pine oil about 48%-80% (w/w);
    low to medium rosin tall oil about 15%-40% (w/w);
    KOH about 3%-10% (w/w);
    wherein the pH of the product is about 8 to about 12.

According to another aspect of the invention, there is provided a method of reducing unwanted vegetation in a soil environment comprising:

spraying the soil environment with an organic herbicide product comprising:
    low lignin content pine oil 48%-75% (w/w);
    low to medium rosin tall oil 18%-31% (w/w);
    KOH about 3%-8% (w/w);
    wherein the pH of the product is about 10 to about 11.

According to another aspect of the invention, there is provided a method of reducing unwanted vegetation in a soil environment comprising:

spraying the soil environment with an organic herbicide product comprising:
    low lignin content pine oil 48%-75% (w/w);
    low to medium rosin tall oil 19.4%-23% (w/w);
    KOH about 4%-8% (w/w);
    wherein the pH of the product is about 10 to about 11.

According to another aspect of the invention, there is provided a method of reducing unwanted vegetation in a soil environment comprising:

spraying the soil environment with an effective amount of an organic herbicide product comprising:
    low lignin content pine oil about 48%-80% (w/w);
    low to medium rosin tall oil about 15%-40% (w/w);
    KOH and NaOH in a combined amount of about 3%-10% (w/w);
    wherein the pH of the product is about 8 to about 12.

As used herein, "soil environment" refers to the soil in which a plant is grown or is growing. As will be appreciated by one of skill in the art, in this context, the plant is "wanted vegetation" or "desired vegetation".

As discussed herein, the alpha-terpineol strips down or reduces or disrupts the wax on weed leaf tissue and/or the casing structure of weed seeds in and on the ground. This exposes the epidermal cells in the leaf structures, exposing these cells to the environment which leads to blackening or browning of the leaf almost immediately as well as causing loss of water. The leaf area dies and then the plant root system dies. With seeds, the shell casing is damaged and the interior of the seed is exposed to the elements as well, leading to loss of viability of the seed or seed death. For example, FIG. 1 shows electron microscope photos of seeds subjected to different percentages of the organic herbicide of the invention. The left frame shows a control or untreated seed. The middle frame shows an exemplary seed treated with 2.5% (w/w) herbicide which shows visible cracking of the seed casing. The right frame shows an exemplary seed treated with 10% (w/w) organic herbicide which shows opening of the seed casing and exposure of the interior of the seed.

As will be apparent to one of skill in the art, reduction of seed viability is an important factor for weed control as reduction of seed viability reduces future weeds, ultimately making future weed control easier and potentially allowing for less herbicide to be used in future years.

According to another embodiment of the invention, there is provided a method for reducing seed viability comprising:

spraying a soil environment with an organic herbicide product comprising:
    low lignin content pine oil about 48%-80% (w/w);
    low to medium rosin tall oil about 15%-40% (w/w);
    KOH about 3%-10% (w/w);
    wherein the pH of the product is about 8 to about 12.

According to another embodiment of the invention, there is provided a method for reducing seed viability comprising:

spraying a soil environment with an organic herbicide product comprising:
    low lignin content pine oil 48%-75% (w/w);
    low to medium rosin tall oil 18%-31% (w/w);
    KOH about 3%-8% (w/w);
    wherein the pH of the product is about 10 to about 11.

According to another embodiment of the invention, there is provided a method for reducing seed viability comprising:

spraying a soil environment with an organic herbicide product comprising:
    low lignin content pine oil 48%-75% (w/w);
    low to medium rosin tall oil 19.4%-23% (w/w);
    KOH about 4%-8% (w/w);
    wherein the pH of the product is about 10 to about 11.

According to another embodiment of the invention, there is provided a method for reducing seed viability comprising:

spraying a soil environment with an effective amount of an organic herbicide product comprising:
    low lignin content pine oil about 48%-80% (w/w);
    low to medium rosin tall oil about 15%-40% (w/w);
    KOH and NaOH in a combined amount of about 3%-10% (w/w);
    wherein the pH of the product is about 8 to about 12.

In some embodiments, the organic herbicide product is the form of a concentrate (e.g. an emulsified concentrate) which is mixed or diluted with water to form, for example, an emulsion-in-water which is sprayable on the soil environment.

In some embodiments, the organic herbicide product damages the shell casing of the seed, thereby exposing the interior of the seed to the elements.

In some embodiments, the seed is present in the soil environment and/or is present on unwanted vegetation growing within the soil environment.

In some embodiments, the seeds are weed seeds.

In some embodiments of the invention, the weed seeds are on the surface of the soil environment or are marginally under the surface of the soil environment.

As discussed herein, it has subsequently been demonstrated that alpha-terpineol is the active ingredient of the herbicide product. It has also been found that impurities including high levels of lignin had an important impact on the end product. There is typically no or only extremely low levels, for example, trace levels, of lignin.

Accordingly, in some embodiments, the low lignin content pine oil has trace amounts of lignin, that is, is substantially free of lignin. As will be appreciated by a person skilled in the art, a trace amount of lignin is less than 1% (w/v). In some embodiments, the organic herbicide product comprises no lignin.

Previously, there was no quality control and pine oils from harvested pine trees produced a mix of pine oil that had high levels of impurities or anti-efficacy agents such as for example lignin.

However, it was subsequently determined that alpha-terpineol levels should preferably exceed 48% (w/w) in the formulation with 53% (w/w) levels proving most effective.

Thus, in some embodiments, the organic herbicide product comprises low lignin content pine oil having alpha-terpineol levels of at least about 48% (w/w), preferably having alpha-terpineol levels of about 53% (w/w). Furthermore, it is preferable to have very low levels of or no lignin. Thus, in some embodiments, the organic herbicide product comprises no lignin.

As noted above, a combination of NaOH and KOH was used as the alkali in the initial process which contained synthetic pine oil, as discussed above. It was subsequently discovered that hand-tapped pine oil did not need to use NaOH in the mix and could use KOH alone as the akali. Surprisingly, this allows better solubility of pine oil in $H_2O$ as it holds in suspension. Specifically, the use of KOH ensures that the new formulation is completely soluble in water which enhances the final distribution of spray. Thus, in some embodiments, the organic herbicide product does not comprise sodium hydroxide (NaOH), and NaOH is not used in the preparation of the organic herbicide product.

As discussed above, in the prior art formulation, water was used as a formulation component and was added in the end product. However, in the organic herbicide of the invention, the addition of water to the product formulation is no longer necessary due to the fact that the hand-tapped pine oil did not require its addition due to the use of KOH only, as discussed above. Thus, in some embodiments, the organic herbicide product does not comprise exogenously added water, i.e. water added as a separate component.

Furthermore, it was originally believed that heating was necessary to uniformly mix pine oil and pine fatty acids with alkali for saponification. Because of this, in the prior art processes, the production was carried out at 80° C. However, it was subsequently found that heating at temperatures exceeding 80° C. partially vaporizes the alpha-terpineol which will in turn reduce product efficacy. As such, the heating step resulted in constant batch quality problems and product recalls of the prior art formulations. Thus, in some embodiments, the organic herbicide product is produced by a process that does not include a step of heating at 80° C. or more. In some embodiments, the organic herbicide product is produced by a process that does not include a step of heating at 70° C. or more. Typically, the blending and/or mixing of the components of the organic herbicide product occurs at ambient temperature, e.g. at a temperature in the range of about 10° C. to 35° C., e.g. at about 10° C., about 15° C., about 20° C., about 25° C., about 30° C., or about 35° C.

However, because the hand-tapped pine oil has greater solubility, the inventor was able to develop a cold manufacturing process wherein heating steps are removed from the production process. This cold manufacturing process was found to be useful in preparing the organic herbicide product comprising low lignin content pine oils. Thus, in some embodiments, the organic herbicide product is produced by a process that does not involve any heating step. The organic herbicide product may, for example, be produced by a process that involves mixing the components at ambient temperature for about 1 to about 5 hours, e.g. about 1 hour, about 1.5 hours, about 2 hours, about 2.5 hours, about 3 hours, about 3.5 hours, about 4 hours, about 4.5 hours, or about 5 hours.

Thus, according to another aspect of the invention, there is provided a process for preparing the organic herbicide product described above, the process comprising mixing at ambient temperature for a time sufficient to cause saponification:

low lignin content pine oil about 48%-80% (w/w);
low to medium rosin tall oil about 15%-40% (w/w);
KOH about 3%-10% (w/w);
wherein the pH of the product is about 8 to about 12.

According to another aspect of the invention, there is provided a process for preparing the organic herbicide product described above, the process comprising mixing at ambient temperature for a time sufficient to cause saponification:

low lignin content pine oil 48%-75% (w/w);
low to medium rosin tall oil 18%-31% (w/w);
KOH about 3%-8% (w/w);
wherein the pH of the product is about 10 to about 11.

According to another aspect of the invention, there is provided a process for preparing the organic herbicide product described above, the process comprising mixing at ambient temperature for a time sufficient to cause saponification:

low lignin content pine oil 48%-75% (w/w);
low to medium rosin tall oil 19.4%-23% (w/w);
KOH about 4%-8% (w/w);
wherein the pH of the product is about 10 to about 11.

According to another aspect of the invention, there is provided a process for preparing the organic herbicide product described above, the process comprising mixing at ambient temperature for a time sufficient to cause saponification:

low lignin content pine oil about 48%-80% (w/w);
low to medium rosin tall oil about 15%-40% (w/w);
KOH and NaOH in a combined amount of about 3%-10% (w/w);
wherein the pH of the product is about 8 to about 12.

The process for preparing the organic herbicide product involves mixing the components at ambient temperature. Ambient temperature will depend on the temperature of the facility in which the preparation process is conducted, and in some embodiments may be in the range of about 10° C. to 35° C., e.g. at about 10° C., about 15° C., about 20° C., about 25° C., about 30° C., or about 35° C.

The mixing may be conducted by any suitable mixing means, e.g. a mechanical stirrer.

In some embodiments, the time sufficient to cause saponification is about 1 to about 5 hours, e.g. about 1 hour, about 1.5 hours, about 2 hours, about 2.5 hours, about 3 hours, about 3.5 hours, about 4 hours, about 4.5 hours, or about 5 hours.

For example, the organic herbicide product may be prepared by a process comprising the following steps:

(a) The Epinol 85™ pine oil is put into a mixing tank at ambient temperature with mechanical stirring activated.

(b) Low to Medium Rosin Tall Oil is then added at a rate of, for example, approximately 60 L/min (stirring may continue uninterrupted).

(c) Aqueous KOH solution is then added at a rate of approximately 3 L/min (stirring may continue uninterrupted).

(d) The pH is checked at approximately 1-minute intervals during step (c).

(e) Upon completion of adding all the ingredients, mechanical stirring continues for about 1 to about 5 hours (e.g. 180 minutes).

(f) The resulting blended mixture is then pumped into containers (e.g. 1000 L Intermediate Bulk Containers) and stored awaiting bottling into the desired size containers suitable for sale.

As will be appreciated by one of skill in the art, this is a more energy efficient manufacturing process that makes better use of valuable pine oil and produces a more effective product.

As noted above, in the prior art iterations of the formula, tall oil PineChem 317 (now discontinued), which has a rosin acid content of about 30-33% (w/w) was used. During winter months, tall oil tends to have greater concentrations of rosin acid. The rosin acid tended to settle in the bottom of containers during storage/transport due to coagulation and this consequentially resulted in substantial product recalls. Also, as a result of the impurities in the mix such as lignin, the formulation coagulated in cold temperatures, for example in winter months and/or during shipping at latitudes less than 35 degrees North and South. Furthermore, the prior art formulation could not be sprayed under cool conditions for example at temperatures less than 12° C.

As such, it has been discovered that the quality of the tall oil is essential for product performance. As discussed herein, the tall oil preferably has a rosin acid content of 30% (w/w) or less. One example of such a suitable low to medium rosin tall oil is the medium rosin tall oil sold under the trade name Pinechem 300, which is a commercially available tall oil. Consequently, as discussed above, low to medium rosin acid tall oil is used for the manufacturing of the herbicide product. As a result, there is now no coagulation in the product mix even at 2° C. Furthermore, the formulation utilizing hand-tapped pine oil using low to medium rosin acid tall oil can now be sprayed at any temperature and at any latitude or altitude with excellent results.

In some embodiments, the hand-tapped pine oil is marketed under the brand Epinol 85™ which is 99% (w/w) pure pine oil.

In some embodiments, the organic herbicide product comprises hand-tapped pine oil, a low to medium rosin tall oil having less than 30% (w/w) rosin, and KOH, wherein the pH of the product is about 8 to about 12 (e.g. about 10 to about 11). The organic herbicide product may be prepared by mixing the components at ambient temperature, typically for about 1 to about 5 hours (e.g. 3 hours).

In some embodiments, the organic herbicide product comprises hand-tapped pine oil, a low to medium rosin tall oil having less than 30% (w/w) rosin, KOH, and NaOH, wherein the pH of the product is about 8 to about 12 (e.g. about 10 to about 11). The organic herbicide product may be prepared by mixing the components at ambient temperature, typically for about 1 to about 5 hours (e.g. 3 hours).

In some embodiments, the organic herbicide product comprises a low lignin content synthetic pine oil, a low to medium rosin tall oil having less than 30% (w/w) rosin, and KOH, wherein the pH of the product is about 8 to about 12 (e.g. about 10 to about 11). The organic herbicide product may be prepared by mixing the components at ambient temperature, typically for about 1 to about 5 hours (e.g. 3 hours).

In some embodiments, the organic herbicide product comprises a low lignin content synthetic pine oil, a low to medium rosin tall oil having less than 30% (w/w) rosin, KOH, and NaOH, wherein the pH of the product is about 8 to about 12 (e.g. about 10 to about 11). The organic herbicide product may be prepared by mixing the components at ambient temperature, typically for about 1 to about 5 hours (e.g. 3 hours).

Exemplary formulations are provided below:

Formulation A: "BioWeed 680" Formulation:
  Pinechem 530 (synthetic pine oil)—75% (w/w)
  Tall oil (Pinechem 317)—20% (w/w)

NaOH—2.5% (w/w)
  KOH—2.5% (w/w)
  pH—10.2
Formulation B: "BioWeed 680 Ultra" Formulation:
  Epinol 85™ (99% (w/w) pure pine oil)—75% (w/w)
  Tall Oil (Pinechem 300)—20% (w/w)
  KOH—5% (w/w)
  pH—10.2
Formulation C:
  Epinol 85™ (99% (w/w) pure pine oil)—72% (w/w)
  Tall Oil (Pinechem 300)—19.4% (w/w)
  KOH—8.6% (w/w) (using a 47% (w/w) KOH solution)
  pH—10 to 11

The above Formulation C may be prepared by mixing 740 mL Epinol 85™ (99% (w/w) pure pine oil), 200 mL Pinechem 300, and 60 mL KOH 47 solution (47% (w/w) KOH solution). The process of preparing Formulation C is described below.

Into a large vat with mixing capability and at ambient temperature are added the following components:
  (1) 740 litres of Epinol 85™ pine oil with mechanical stirring activated;
  (2) 200 litres of Pinechem 300 at an approximate rate of 60 L/min with uninterrupted stirring;
  (3) 60 litres of KOH 47% (w/w) aqueous solution slowly at an approximate rate of 3 L/min with uninterrupted stirring;
  (4) continue to stir mixture for approximately 3 hours.

The resulting blended mixture may be pumped into 1,000 L container(s) and stored awaiting bottling into the desired size containers suitable for use.

The amounts of the components in % (v/v) in Formulation C are as follows:
  74% (v/v) of Epinol 85™ pine oil;
  20% (v/v) of Pinechem 300—distilled tall oil having medium rosin content;
  6% (v/v) of KOH 47% (w/w) aqueous solution.

According to a further aspect of the invention, there is provided an organic herbicide product comprising:
  low lignin content pine oil;
  low to medium rosin tall oil;
  KOH;
  wherein the pH of the product is about 8 to about 12 (e.g. about 10 to about 11).

According to a further aspect of the invention, there is provided an organic herbicide product consisting essentially of:
  low lignin content pine oil;
  low to medium rosin tall oil;
  KOH;
  wherein the pH of the product is about 8 to about 12 (e.g. about 10 to about 11).

According to a further aspect of the invention, there is provided an organic herbicide product consisting of:
  low lignin content pine oil;
  low to medium rosin tall oil;
  KOH;
  wherein the pH of the product is about 8 to about 12 (e.g. about 10 to about 11).

According to a further aspect of the invention, there is provided a method of reducing unwanted vegetation in a soil environment comprising:
  spraying the soil environment with an organic herbicide product comprising:
  low lignin content pine oil;
  low to medium rosin tall oil;

KOH;

wherein the pH of the product is about 8 to about 12 (e.g. about 10 to about 11).

According to a further aspect of the invention, there is provided a method for reducing seed viability comprising:

spraying a soil environment with an organic herbicide product comprising:

low lignin content pine oil;

low to medium rosin tall oil;

KOH;

wherein the pH of the product is about 8 to about 12 (e.g. about 10 to about 11).

According to a further aspect of the invention, there is provided an organic herbicide product comprising:

low lignin content pine oil;

low to medium rosin tall oil;

KOH and NaOH;

wherein the pH of the product is about 8 to about 12 (e.g. about 10 to about 11).

According to a further aspect of the invention, there is provided an organic herbicide product consisting essentially of:

low lignin content pine oil;

low to medium rosin tall oil;

KOH and NaOH;

wherein the pH of the product is about 8 to about 12 (e.g. about 10 to about 11).

According to a further aspect of the invention, there is provided an organic herbicide product consisting of:

low lignin content pine oil;

low to medium rosin tall oil;

KOH and NaOH;

wherein the pH of the product is about 8 to about 12 (e.g. about 10 to about 11).

According to a further aspect of the invention, there is provided a method of reducing unwanted vegetation in a soil environment comprising:

spraying the soil environment with an organic herbicide product comprising:

low lignin content pine oil;

low to medium rosin tall oil;

KOH and NaOH;

wherein the pH of the product is about 8 to about 12 (e.g. about 10 to about 11).

According to a further aspect of the invention, there is provided a method for reducing seed viability comprising:

spraying a soil environment with an organic herbicide product comprising:

low lignin content pine oil;

low to medium rosin tall oil;

KOH and NaOH;

wherein the pH of the product is about 8 to about 12 (e.g. about 10 to about 11).

According to a further aspect of the invention, there is provided a process for preparing an organic herbicide product, the process comprising mixing at ambient temperature for a time sufficient to cause saponification:

low lignin content pine oil;

low to medium rosin tall oil;

KOH;

wherein the pH of the product is about 8 to about 12 (e.g. about 10 to about 11).

According to a further aspect of the invention, there is provided a process for preparing an organic herbicide product, the process comprising mixing at ambient temperature for a time sufficient to cause saponification:

low lignin content pine oil;

low to medium rosin tall oil;

KOH and NaOH;

wherein the pH of the product is about 8 to about 12 (e.g. about 10 to about 11).

The invention will now be further explained and/or elucidated by way of examples; however, the invention is not necessarily limited to the examples.

EXAMPLES

Abbreviations

| | |
|---|---|
| KOH | potassium hydroxide |
| NaOH | sodium hydroxide |
| ai | active ingredient |
| DAA | days after application |
| EW | emulsion-in-water |

Two formulations of the invention, "BioWeed 680" and "BioWeed 680 Ultra", were prepared by mixing the components at ambient temperature for 3 hours. The formulations are set out below:

"BioWeed 680" Formulation (pH: 10.2)

| Component: | Amount (% (w/w)) |
|---|---|
| Pinechem 530 | 75% |
| Tall oil (Pinechem 317) | 20% |
| NaOH | 2.5% |
| KOH | 2.5% |

"BioWeed 680 Ultra" Formulation (pH: 10.2)

| Component: | Amount (% (w/w)) |
|---|---|
| Hand-tapped pine oil (Epinol 85 ™) | 75% |
| Tall oil (Pinechem 300) | 20% |
| KOH | 5% |

A prior art synthetic pine oil-based herbicide (Organic Interceptor™) was prepared by mixing the following ingredients together: synthetic New Zealand pine oil (Pinechem 530; CAS 800-09-3) added at 684 g/L, distilled tall oil (Pinechem 317; CAS 8002-26-4) added at 159 g/L (purpose: acid reaction ingredient to produce tall oil soap), NaOH (CAS 1310-73-2) added at 8.4 g/L (purpose: alkaline reaction to form tall oil soap), and KOH (CAS 1310-58-3) added at 12.6 g/L (purpose: alkaline reaction to form tall oil soap). Water (CAS 7732-18-5) was added to adjust the mix to 1 L. The mixture was heated in a heating vessel at 80° C. for 7 to 10 hours, and then cooled to 35° C.

Field Tests

Field tests were carried out in Tasmania, Australia (latitude about 41 degrees South) comparing the effectiveness of each of the above formulations (BioWeed 680, BioWeed 680 Ultra, and Organic Interceptor™). The formulations were mixed with water to form an emulsion-in-water prior to spraying (5% and 10% dilution). The BioWeed 680 emulsion-in-water was called "BioWeed 680 EW", and the BioWeed 680 Ultra emulsion-in-water was called "BioWeed 680 Ultra EW".

The results are summarized below.

At Forth, Tasmania, in 2019, a field trial was conducted to compare pine oil-based herbicides: BioWeed 680 EW and BioWeed 680 Ultra EW with Organic Interceptor™ for the control of annual ryegrass (*Lolium rigidum*), red-root amaranth (*Amaranthus retroflexus*), fat hen (*Chenopodium album*), and blackberry nightshade (*Solanum nigrum*) in fallow. Treatments included; BioWeed 680, BioWeed 680 Ultra, and Organic Interceptor™ each applied solo at 34 or 68 g ai/L (equivalent to 13.26 and 26.52 kg ai/ha at 390 L/ha spray volume); and an untreated control. As such, it is important to note that each pine oil-based herbicide was applied at comparable levels of active ingredient, as noted above.

Treatments were applied as a single application to seedling weeds at the 2-4 true leaf (BBCH 12-14) growth stage in a spray volume of 390 L/ha generating a medium spray quality.

Weed density was assessed prior to application and at 14 days after application (14DAA). Weed brownout was assessed at 7DAA and 14DAA. Normalised difference vegetation index (NDVI) was assessed at 14DAA.

Herbicides were moderately effective against annual ryegrass. Specifically, Organic Interceptor™ applied at 34 g ai/L resulted in 5% leaf area brownout after 7 days and 0% after 14 days and 23% and 11% when applied at 68 g ai/L. At 7DAA BioWeed 680 Ultra (33% when applied at 68 g ai/L, 10% when applied at 34 g ai/L) demonstrated a significant advantage against annual rye grass compared to BioWeed 680 (14% at 68 g ai/L and 11% at 34 g ai/L) and Organic Interceptor™. At 14DAA, BioWeed 680 Ultra resulted in 3% brownout (34 g ai/L) and 16% (68 g ai/L) compared to 5% (34 g ai/L) and 0% (68 g ai/L) for BioWeed 680 and 0% (34 g ai/L) and 11% (68 g ai/L) for Organic Interceptor™.

Herbicides were much more effective against broadleaf weeds, especially at 68 g ai/L, with average brownout to 75% leaf area of red-root amaranth, 81% of fat hen leaf area and 83% of blackberry nightshade leaf area at 14DAA.

Specifically, BioWeed 680 Ultra was the most effective herbicide with significantly more brownout to fat hen (86% at 68 g ai/L; 30% at 34 g ai/L at 7DAA; 89% at 68 g ai/L, 74% at 34 g ai/L at 14DAA) compared to BioWeed 680 (64% at 68 g ai/L, 28% at 34 g ai/L at 7DAA; 64% at 68 g ai/L, 58% at 34 g ai/L at 14DAA) and Organic Interceptor™ (86% at 68 g ai/L, 24% at 34 g ai/L at 7DAA, 90% at 68 g ai/L, 5% at 34 g ai/L at 14DAA).

Regarding red-root amaranth, BioWeed 680 Ultra showed more brownout (92% at 68 g ai/L, 35% at 34 g ai/L at 7DAA, 88% at 68 g ai/L, 59% at 34 g ai/L at 14DAA) compared to BioWeed 680 (75% at 68 g ai/L, 70% at 34 g ai/L at 7DAA; 60% at 68 g ai/L, 60% at 34 g ai/L at 14DAA) and Organic Interceptor™ (91% at 68 g ai/L, 29% at 34 g ai/L at 7DAA; 79% at 68 g ai/L, 9% at 34 g ai/L at 14DAA).

Regarding blackberry nightshade, BioWeed 680 Ultra showed more brownout (84% at 68 g ai/L, 11% at 34 g ai/L at 7DAA; 91% at 68 g ai/L, 73% at 34 g ai/L, at 14DAA) compared to BioWeed 680 (51% at 68 g ai/L, 23% at 34 g ai/L at 7DAA; 65% at 68 g ai/L, 58% at 34 g ai/L at 14DAA) and Organic Interceptor™ (93% at 68 g ai/L, 11% at 34 g ai/L at 7DAA; 91% at 68 g ai/L, 13% at 34 g ai/L at 14DAA).

As can be seen, BioWeed 680 generally demonstrated a numerical advantage over Organic Interceptor™ for the control of broadleaf weeds but was less consistent than BioWeed 680 Ultra. BioWeed 680 and BioWeed 680 Ultra caused significantly more brownout when applied at 34 g ai/L to all broadleaf weed species at 14DAA when compared to Organic Interceptor™ applied at 34 g ai/L.

The normalised difference vegetation index (NDVI) of plots was equivalent for all herbicide treatments though BioWeed 680 Ultra (0.23 at 68 g ai/L, 0.32 at 34 g ai/L) demonstrated a numerical advantage over BioWeed 680 (0.40 at 68 g ai/L, 0.36 at 34 g ai/L) and Organic Interceptor™ (0.23 at 68 g ai/L, 0.39 at 34 g ai/L) and was the only herbicide to significantly reduce the NDVI compared to the untreated control (0.59) at both application rates.

CONCLUSION

BioWeed 680 and BioWeed 680 Ultra were very effective herbicides against all assessed weeds, with BioWeed 680 Ultra being the most effective herbicide against all assessed weeds.

Organic Interceptor™ was very effective at 68 g ai/L but demonstrated little effect on weeds when applied at 34 g ai/L.

It is interesting to note that the original Innes Patent, discussed above, "teaches a herbicidal combination of monoterpene alcohols and fatty acid soaps, where the fatty acid soap may be derived from the reaction of a tall oil with an alkali."

Specifically, in the original formulation, the product label referred to "distilled Tall Oil soap". However, in fact, distilled tall oil was used in conjunction with sodium hydroxide (NaOH) and potassium hydroxide (KOH).

The BioWeed formulations solve the problems associated with the prior art Organic Interceptor™ product and in doing so are more effective in the field. Advantageously, the BioWeed products are less costly to produce, cheaper to transport, require less quality control, and have overcome the temperature constraints experienced with the prior art Organic Interceptor™ product.

While the preferred embodiments of the invention have been described above, it will be recognized and understood that various modifications may be made therein, and the appended claims are intended to cover all such modifications which may fall within the spirit and scope of the invention.

Also described herein are the following items 1 to 26:

1 An organic herbicide product comprising:
   low lignin content pine oil 48-68% (w/w);
   low resin tall oil—23.5%-31% (w/w);
   KOH about 5-8% (w/w)
   pH to about 10 to about 11.

2. The organic herbicide product according to item 1 wherein the low lignin content pine oil comprises:

| | |
|---|---|
| 3. carene | 1.3%-2.0% |
| Limonene | 6.0%-7.20 |
| Eucalyptol | 0.08%-0.90% |
| g terpinene | 1.00%-1.55% |
| limonene isomer | 10.90%-11.10% |
| fenchol | 1.00%-1.70% |
| b terpinenol | 4.40%-5.50% |
| g terpinenol | 3.00%-3.10% |
| endo borneol | 1.50%-2.30% |
| terpinen-4-ol | 1.80%-2.10% |
| alpha-terpinenol | 48.0%-54.9%; and |
| 2. carene | 9.00%-9.35%. |

3. The organic herbicide product according to item 1 or 2 wherein the low lignin content pine oil is hand-tapped pine oil.

4. The organic herbicide product of any one of items 1-3 wherein dipentene levels are less than 2%.

5. The organic herbicide product according to item 1 wherein the low lignin content pine oil has trace levels of lignin.

6. The organic herbicide product according to item 1 wherein the product is substantially free of NaOH.
7. The organic herbicide product according to any one of items 1-6 wherein the low lignin content pine oil is 53-68% of the organic herbicide product.
8. The organic herbicide product according to any one of items 1-6 wherein the low lignin content pine oil is 61-68% of the organic herbicide product.
9. A method of reducing unwanted vegetation in a soil environment comprising:
  spraying the soil environment with an effective amount of an organic herbicide product comprising:
  low lignin content pine oil 48-68% (w/w);
  low resin tall oil—23.5%-31% (w/w);
  KOH about 5-8% (w/w)
  pH to about 10 to about 11.
10. The method according to item 9 wherein the low lignin content pine oil comprises:

| | |
|---|---|
| 3. carene | 1.3%-2.0% |
| Limonene | 6.0%-7.20 |
| Eucalyptol | 0.08%-0.90% |
| g terpinene | 1.00%-1.55% |
| limonene isomer | 10.90%-11.10% |
| fenchol | 1.00%-1.70% |
| b terpinenol | 4.40%-5.50% |
| g terpinenol | 3.00%-3.10% |
| endo borneol | 1.50%-2.30% |
| terpinen-4-ol | 1.80%-2.10% |
| alpha-terpinenol | 48.0%-54.9%; and |
| 2. carene | 9.00%-9.35%. |

11. The method according to item 9 or 10 wherein the low lignin content pine oil is hand-tapped pine oil.
12. The method of any one of item 9-11 wherein dipentene levels in the organic herbicide product are less than 2%.
13. The method according to item 9 wherein the low lignin content pine oil has trace levels of lignin.
14. The method according to item 9 wherein the organic herbicide product is substantially free of NaOH.
15. The method according to any one of items 9-14 wherein the low lignin content pine oil is at 53-68% of the organic herbicide product.
16. The method according to any one of items 9-14 wherein the low lignin content pine oil is at 61-68% of the organic herbicide product.
17. A method for reducing seed viability comprising:
  spraying a soil environment with an effective amount of an organic herbicide product comprising:
  low lignin content pine oil 48-68% (w/w);
  low resin tall oil—23.5%-31% (w/w);
  KOH about 5-8% (w/w);
  pH to about 10 to about 11.
18. The method according to item 17 wherein the organic herbicide damages the shell casing of the seed, thereby exposing the interior of the seed to the elements.
19. The method according to item 17 wherein the seed is present in the soil environment and/or is present on unwanted vegetation growing within the soil environment.
20. The method according to item 17 wherein the low lignin content pine oil comprises:

| | |
|---|---|
| 3. carene | 1.3%-2.0% |
| Limonene | 6.0%-7.20 |
| Eucalyptol | 0.08%-0.90% |

-continued

| | |
|---|---|
| g terpinene | 1.00%-1.55% |
| limonene isomer | 10.90%-11.10% |
| fenchol | 1.00%-1.70% |
| b terpinenol | 4.40%-5.50% |
| g terpinenol | 3.00%-3.10% |
| endo borneol | 1.50%-2.30% |
| terpinen-4-ol | 1.80%-2.10% |
| alpha-terpinenol | 48.0%-54.9%; and |
| 2. carene | 9.00%-9.35%. |

21. The method according to item 17 wherein the low lignin content pine oil is hand-tapped pine oil.
22. The method of item 17 wherein dipentene levels in the organic herbicide product are less than 2%.
23. The method according to item 17 wherein the low lignin content pine oil has trace levels of lignin.
24. The method according to item 17 wherein the organic herbicide product is substantially free of NaOH.
25. The method according to item 17 wherein the low lignin content pine oil is at 53-68% of the organic herbicide product.
26. The method according to item 17 wherein the low lignin content pine oil is at 61-68% of the organic herbicide product.

The invention claimed is:
1. An organic herbicide product comprising:
  low lignin content pine oil about 48%-75% (w/w);
  low to medium rosin tall oil about 19.4%-23% (w/w); and
  KOH about 4%-8% (w/w);
  wherein the pH of the product is about 10 to about 11;
  wherein the low lignin content pine oil comprises less than 1% (w/v) lignin;
  wherein the low lignin content pine oil comprises hand-tapped pine oil;
  wherein the low to medium rosin tall oil is a tall oil with 30% (w/w) or less rosin acid; and
  wherein the organic herbicide product does not contain NaOH.
2. The organic herbicide product according to claim 1, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

3. The organic herbicide product according to claim 1, wherein the low lignin content pine oil is hand-tapped pine oil.
4. The organic herbicide product according to claim 1, wherein the low lignin content pine oil comprises less than 0.5% (w/v) lignin.
5. The organic herbicide product according to claim 1, wherein the low lignin content pine oil is present at 53% (w/w), 54% (w/w), 55% (w/w), 56% (w/w), 57% (w/w), 58% (w/w), 59% (w/w), 60% (w/w), 61% (w/w), 62% (w/w), 63% (w/w), 64% (w/w), 65% (w/w), 66% (w/w), 67% (w/w), 68% (w/w), 68.5% (w/w), 69% (w/w), 70%

(w/w), 71% (w/w), 72% (w/w), 73% (w/w), 74% (w/w), or 75% (w/w) of the organic herbicide product.

6. A method of reducing unwanted vegetation in a soil environment comprising:

spraying the soil environment with an effective amount of an organic herbicide product comprising:

low lignin content pine oil about 48%-75% (w/w);

low to medium rosin tall oil about 19.4%-23% (w/w); and

KOH about 4%-8% (w/w);

wherein the pH of the product is about 10 to about 11;

wherein the low lignin content pine oil comprises less than 1% (w/v) lignin;

wherein the low lignin content pine oil comprises hand-tapped pine oil;

wherein the low to medium rosin tall oil is a tall oil with 30% (w/w) or less rosin acid; and wherein the organic herbicide product does not contain NaOH.

7. The method according to claim 6, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

8. The method according to claim 6, wherein the low lignin content pine oil is hand-tapped pine oil.

9. The method according to claim 6, wherein the low lignin content pine oil comprises less than 0.5% (w/v) lignin.

10. The method according to claim 6, wherein the low lignin content pine oil is present at 53% (w/w), 54% (w/w), 55% (w/w), 56% (w/w), 57% (w/w), 58% (w/w), 59% (w/w), 60% (w/w), 61% (w/w), 62% (w/w), 63% (w/w), 64% (w/w), 65% (w/w), 66% (w/w), 67% (w/w), 68% (w/w), 68.5% (w/w), 69% (w/w), 70% (w/w), 71% (w/w), 72% (w/w), 73% (w/w), 74% (w/w), or 75% (w/w) of the organic herbicide product.

11. The method according to claim 6, wherein the unwanted vegetation is annual ryegrass (*Lolium rigidum*), red-root amaranth (*Amaranthus retroflexus*), fat hen (*Chenopodium album*), or blackberry nightshade (*Solanum nigrum*).

12. The method according to claim 6, wherein the organic herbicide product is a concentrate which is mixed or diluted with water, and optionally wherein the organic herbicide product is in the form of an emulsion-in-water.

13. A method for reducing seed viability comprising:

spraying a soil environment with an effective amount of an organic herbicide product comprising:

low lignin content pine oil about 48%-75% (w/w);

low to medium rosin tall oil about 19.4%-23% (w/w); and

KOH about 4%-8% (w/w);

wherein the pH of the product is about 10 to about 11;

wherein the low lignin content pine oil comprises less than 1% (w/v) lignin;

wherein the low lignin content pine oil comprises hand-tapped pine oil;

wherein the low to medium rosin tall oil is a tall oil with 30% (w/w) or less rosin acid; and wherein the organic herbicide product does not contain NaOH.

14. The method according to claim 13, wherein the organic herbicide product damages the shell casing of the seed, thereby exposing the interior of the seed to an element.

15. The method according to claim 13, wherein the seed is present in the soil environment and/or is present on unwanted vegetation growing within the soil environment.

16. The method according to claim 13, wherein the low lignin content pine oil comprises (% w/w):

| | |
|---|---|
| 3-carene | 1.3%-2.0% |
| Limonene | 6.0%-7.20 |
| Eucalyptol | 0.08%-0.90% |
| g terpinene | 1.00%-1.55% |
| limonene isomer | 10.90%-11.10% |
| fenchol | 1.00%-1.70% |
| b terpinenol | 4.40%-5.50% |
| g terpinenol | 3.00%-3.10% |
| endo borneol | 1.50%-2.30% |
| terpinen-4-ol | 1.80%-2.10% |
| alpha-terpinenol | 48.0%-54.9%; and |
| 2-carene | 9.00%-9.[[,]]35%. |

17. The method according to claim 13, wherein the low lignin content pine oil is hand-tapped pine oil.

18. The method according to claim 13, wherein the low lignin content pine oil comprises less than 0.5% (w/v) lignin.

19. The method according to claim 13, wherein the low lignin content pine oil is present at 53% (w/w), 54% (w/w), 55% (w/w), 56% (w/w), 57% (w/w), 58% (w/w), 59% (w/w), 60% (w/w), 61% (w/w), 62% (w/w), 63% (w/w), 64% (w/w), 65% (w/w), 66% (w/w), 67% (w/w), 68% (w/w), 68.5% (w/w), 69% (w/w), 70% (w/w), 71% (w/w), 72% (w/w), 73% (w/w), 74% (w/w), or 75% (w/w) of the organic herbicide product.

20. The method according to claim 13, for reducing the seed viability for seeds of annual ryegrass (*Lolium rigidum*), red-root amaranth (*Amaranthus retroflexus*), fat hen (*Chenopodium album*), or blackberry nightshade (*Solanum nigrum*).

21. The method according to claim 13, wherein the organic herbicide product is a concentrate which is mixed or diluted with water, and optionally wherein the organic herbicide product is in the form of an emulsion-in-water.

22. A process for preparing an organic herbicide product, the process comprising mixing at ambient temperature for a time sufficient to cause saponification:

low lignin content pine oil about 48%-75% (w/w);

low to medium rosin tall oil about 19.4%-23% (w/w); and

KOH about 4%-8% (w/w);

wherein the pH of the product is about 10 to about 11;

wherein the low lignin content pine oil comprises less than 1% (w/v) lignin;

wherein the low lignin content pine oil comprises hand-tapped pine oil;

wherein the low to medium rosin tall oil is a tall oil with 30% (w/w) or less rosin acid; and wherein the organic herbicide product does not contain NaOH.

23. The process according to claim 22, wherein the mixing is conducted at a temperature of from about 10° C. to about 35° C.

24. The process according to claim 22, wherein the mixing is conducted for about 1 to about 5 hours.

25. The process according to claim 22, wherein the low lignin content pine oil comprises (% w/w):

| | |
|---|---|
| 3-carene | 1.3%-2.0%; |
| Limonene | 6.0%-7.20%; |
| Eucalyptol | 0.08%-0.90%; |
| g terpinene | 1.00%-1.55%; |
| limonene isomer | 10.90%-11.10%; |
| fenchol | 1.00%-1.70%; |
| b terpinenol | 4.40%-5.50%; |
| g terpinenol | 3.00%-3.10%; |
| endo borneol | 1.50%-2.30%; |
| terpinen-4-ol | 1.80%-2.10%; |
| alpha-terpinenol | 48.0%-54.9%; and |
| 2-carene | 9.00%-9.35%. |

26. The process according to claim 22, wherein the low lignin content pine oil is hand-tapped pine oil.

27. The process according to claim 22, wherein the low lignin content pine oil comprises less than 0.5% (w/v) lignin.

28. The process according to claim 22, wherein the low lignin content pine oil is present at 53% (w/w), 54% (w/w), 55% (w/w), 56% (w/w), 57% (w/w), 58% (w/w), 59% (w/w), 60% (w/w), 61% (w/w), 62% (w/w), 63% (w/w), 64% (w/w), 65% (w/w), 66% (w/w), 67% (w/w), 68% (w/w), 68.5% (w/w), 69% (w/w), 70% (w/w), 71% (w/w), 72% (w/w), 73% (w/w), 74% (w/w), or 75% (w/w) of the organic herbicide product.

\* \* \* \* \*